US008954519B2

(12) United States Patent
Dichiu et al.

(10) Patent No.: US 8,954,519 B2
(45) Date of Patent: Feb. 10, 2015

(54) SYSTEMS AND METHODS FOR SPAM DETECTION USING CHARACTER HISTOGRAMS

(75) Inventors: Daniel Dichiu, Bucharest (RO); Lucian Z. Lupsescu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 123 days.

(21) Appl. No.: 13/358,358

(22) Filed: Jan. 25, 2012

(65) Prior Publication Data

US 2013/0191469 A1  Jul. 25, 2013

(51) Int. Cl.
*G06F 15/16* (2006.01)
*H04L 29/06* (2006.01)

(52) U.S. Cl.
CPC .................................. *H04L 63/0263* (2013.01)
USPC ........................................................ 709/206

(58) Field of Classification Search
CPC ... H04L 12/585; H04L 51/12; H04L 63/0263; H04L 43/16; G06F 15/16
USPC ......... 709/204–207, 219–219, 232, 235, 245, 709/246; 706/12–14, 45–61; 707/735; 726/22–33
See application file for complete search history.

(56) References Cited

U.S. PATENT DOCUMENTS

| | | | |
|---|---|---|---|
| 5,418,951 A | 5/1995 | Damashek | |
| 5,828,999 A | 10/1998 | Bellegarda et al. | |
| 6,732,149 B1 | 5/2004 | Kephart | |
| 7,529,719 B2 | 5/2009 | Liu et al. | |
| 7,555,523 B1 | 6/2009 | Hartmann | |
| 7,751,620 B1 | 7/2010 | Cosoi | |
| 8,001,195 B1* | 8/2011 | Kalinin | 709/206 |
| 8,019,704 B1* | 9/2011 | Tong et al. | 706/12 |
| 8,156,063 B1* | 4/2012 | Rahmouni et al. | 706/45 |
| 2003/0167402 A1* | 9/2003 | Stolfo et al. | 713/200 |

(Continued)

FOREIGN PATENT DOCUMENTS

WO  2002019069 A2  3/2002

OTHER PUBLICATIONS

Arslan (Arslan, Abdullah, Efficient Algorithms for Normalized Edit Distance, Nov. 15, 1999, Journal of Discrete Algorithms, vol. 0 No. 0, pp. 1-18).*

(Continued)

*Primary Examiner* — Brian J Gillis
*Assistant Examiner* — Michael A Keller
(74) *Attorney, Agent, or Firm* — Law Office of Andrei D Popovici, PC (57) ABSTRACT

Described spam detection techniques including string identification, pre-filtering, and character histogram and timestamp comparison steps facilitate accurate, computationally-efficient detection of rapidly-changing spam arriving in short-lasting waves. In some embodiments, a computer system extracts a target character string from an electronic communication such as a blog comment, transmits it to an anti-spam server, and receives an indicator of whether the respective electronic communication is spam or non-spam from the anti-spam server. The anti-spam server determines whether the electronic communication is spam or non-spam according to certain features of the character histogram of the target string. Some embodiments also perform an unsupervised clustering of incoming target strings into clusters, wherein all members of a cluster have similar character histograms.

26 Claims, 8 Drawing Sheets

(56) References Cited

U.S. PATENT DOCUMENTS

| | | | |
|---|---|---|---|
| 2003/0204569 A1* | 10/2003 | Andrews et al. | 709/206 |
| 2005/0041789 A1* | 2/2005 | Warren-Smith et al. | 379/93.24 |
| 2005/0193073 A1* | 9/2005 | Mehr et al. | 709/206 |
| 2006/0015564 A1* | 1/2006 | Angelica | 709/206 |
| 2006/0031346 A1 | 2/2006 | Zheng et al. | |
| 2006/0089924 A1 | 4/2006 | Raskutti et al. | |
| 2006/0095521 A1* | 5/2006 | Patinkin | 709/206 |
| 2006/0149820 A1 | 7/2006 | Rajan et al. | |
| 2007/0027992 A1* | 2/2007 | Judge et al. | 709/227 |
| 2008/0133682 A1* | 6/2008 | Chadwick et al. | 709/206 |
| 2008/0301809 A1* | 12/2008 | Choi | 726/23 |
| 2008/0319995 A1* | 12/2008 | Alspector et al. | 707/6 |
| 2009/0024555 A1* | 1/2009 | Rieck et al. | 706/54 |
| 2009/0089220 A1 | 4/2009 | Ciabattoni | |
| 2009/0132669 A1 | 5/2009 | Milliken et al. | |
| 2009/0220166 A1 | 9/2009 | Choi et al. | |
| 2010/0017487 A1* | 1/2010 | Patinkin | 709/206 |
| 2010/0074528 A1 | 3/2010 | Hu et al. | |
| 2010/0082749 A1* | 4/2010 | Wei et al. | 709/206 |
| 2010/0246960 A1 | 9/2010 | Kim | |
| 2010/0333200 A1* | 12/2010 | Chen et al. | 726/22 |
| 2011/0202620 A1* | 8/2011 | Wang | 709/206 |
| 2012/0150967 A1 | 6/2012 | Cai et al. | |
| 2012/0215853 A1* | 8/2012 | Sundaram et al. | 709/206 |
| 2012/0278388 A1* | 11/2012 | Kleinbart et al. | 709/204 |
| 2013/0179166 A1* | 7/2013 | Fujibayashi | 704/235 |

OTHER PUBLICATIONS

Escalante (Escalante, Hugo Jair, Local Histograms of Character N-grams for Authorship Attribution, 2011, Proceedings of the 49th Annual Meeting of the Association for Computational Linguistics, pp. 288-298).*

Hershkop (Hershkop, Shlomo, Behavior-based Email Analysis with Application to Spam Detection, 2006, Columbia University Submitted in partial fulfillment of the requirements for the degree of Doctor of Philosophy in the Graduate School of Arts and Sciences, p. 40-153).*

Marzal (Marzal, Andres, Computation of Normalized Edit Distance and Applications, Sep. 1993, IEEE Transactions on Pattern Analysis and Machine Intelligence, vol. 15, No. 9, p. 1-7).*

Salcedo-Campos (Salcedo-Campos, Francisco, Segmental parameterisation and statistical modelling of e-mail headers for spam detection, Jan. 24, 2012, Dept. of Signal Theory Telematics and Communications ETSIIT CITIC University of Granada 18071 Granada Spain, p. 2-18).*

International Search Report included in application WO 2013112061 a1.*

International Search Report included in application WO 2013112062 a1.*

Ukkonen, "Approximate string-matching with q-grams and maximal matches," Theoretical Computer Science 92 (1992), p. 191-211, Department of Computer Science, University of Helsinki, Helsinki, Finland. Jan. 6, 1992.

Cavnar et al., "N-Gram-Based Text Categorization," p. 1-14, Proceedings of SDAIR-94, 3rd Annual Symposium on Document Analysis and Information Retrieval, Environmental Research Institute of Michigan, Ann Arbor, MI. Apr. 11-13, 1994.

Arneodo et al., "Characterizing Long-Range Correlations in DNA Sequences from Wavelet Analysis," Physical Review Letters, vol. 74, nr. 16, pp. 3293-3296, The American Physical Society, College Park, MD. Apr. 17, 1995.

Porter et al., "Approximate String Comparison and its Effect on an Advanced Record Linkage System," p. 1-10, Proceedings of an International Workshop and Exposition. Federal Committee on Statistical Methodology—Working Papers, U.S. Bureau of the Census, Washington, DC. Mar. 20-21, 1997.

Martin et al., "Algorithms for bigram and trigram word clustering," Speech Communication 24 (1998) pp. 19-37, RWTH Aachen University, Aachen, Germany. 1998; the year of publication is sufficiently earlier than the effective U.S. filing date and any foreign priority date so that the particular month of publication is not in issue.

Anastassiou, "Frequency-domain analysis of biomolecular sequences," Bioinformatics, vol. 16, nr. 12, pp. 1073-1081, Department of Electrical Engineering, Columbia University, New York, NY. Jul. 2000.

Cristea, "Conversion of nucleotides sequences into genomic signals," Journal of Cellular and Molecular Medicine, vol. 6, nr. 2, pp. 279-303. University of Bucharest, Romania, Bucharest, Romania. Apr. 2002.

Chen et al., "Fast Semi-local Alignment for DNA Sequence Database Search," Proceedings of the 16th International Conference on Pattern Recognition, Quebec, Canada, vol. 3, pp. 1019-1022, National Taiwan University, Taipei, Taiwan. Aug. 2002.

Nair, "Are categorical periodograms and indicator sequences of genomes spectrally equivalent?" p. 1-10, In Silico Biology vol. 6, 0019, University of Kerala, India, Thiruvananthapuram, India. May 20, 2006.

Chapman, "String Similarity Metrics for Information Integration," p. 1-11, Natural Language Processing Group, Department of Computer Science, University of Sheffield, Sheffield, United Kingdom, available at http://web.archive.org/web/20081224234350/http://www.dcs.shef.ac.uk/~sam/stringmetrics.html, archive.org indicates document was online on Dec. 24, 2008.

Romulus, "Using Time-Frequency Representations and Hough Transform to Genomic Signal Processing," Acta Electrotehnica, vol. 50, nr 1, pp. 57-62, Mediamira Science Publisher, Cluj-Napoca, Romania. 2009; the year of publication is sufficiently earlier than the effective U.S. filing date and any foreign priority date so that the particular month of publication is not in issue.

Saxena et al., "Identification of DNA Sequences by Applications of Signal Processing Tools in Protein-Coding Regions," International Journal of Electronic Engineering Research, vol. 2, nr. 4, pp. 497-506, Research India Publication, Delhi, India. Sep. 20, 2010.

Dichiu, U.S. Appl. No. 13/358,338, filed Jan. 25, 2012.

United States Patent and Trademark Office (USPTO), Office Action Mailed Jul. 9, 2014 for U.S. Appl. No. 13/358,338, filed Jan. 25, 2012.

European Patent Office, International Preliminary Report on Patentability and Written Opinion of the International Searching Authority Mailed Aug. 7, 2014 for PCT International Application No. PCT/RO2012/000022, International Filing Date Sep. 5, 2012.

European Patent Office, International Preliminary Report on Patentability and Written Opinion of the International Searching Authority Mailed Aug. 7, 2014 for PCT International Application No. PCT/RO2012/000023, International Filing Date Sep. 5, 2012.

* cited by examiner

SYSTEMS AND METHODS FOR SPAM DETECTION USING CHARACTER HISTOGRAMS

BACKGROUND

The invention relates to methods and systems for classifying electronic communications, and in particular to systems and methods for filtering unsolicited commercial electronic communications (spam).

Unsolicited commercial electronic communications, also known as spam, form a significant portion of all communication traffic worldwide, affecting both computer and telephone messaging services. Spam may take many forms, from unsolicited email communications, to spam messages masquerading as user comments on various Internet sites such as blogs and social network sites. Spam takes up valuable hardware resources, affects productivity, and is considered annoying and intrusive by many users of communication services and/or the Internet.

In the case of email spam, software running on a user's or email service provider's computer system may be used to classify email messages as spam or non-spam, and even to discriminate between various kinds of spam messages (e.g., product offers, adult content, email scams). Spam messages can then be directed to special folders or deleted.

Similarly, software running on a content provider's computer systems may be used to intercept fraudulent messages posted to a website and prevent the respective messages from being displayed, or to display a warning to the users of the website that the respective messages may be spam.

Several approaches have been proposed for identifying spam messages, including matching the message's originating address to lists of known offending or trusted addresses (techniques termed black- and white-listing, respectively), searching for certain words or word patterns (e.g. refinancing, Viagra®, stock), and analyzing message headers. Feature extraction/matching methods are often used in conjunction with automated data classification methods (e.g., Bayesian filtering, neural networks).

Spam often arrives in a rapid succession of groups of similar messages also known as spam waves. The form and content of spam may change substantially from one spam wave to another, therefore successful detection may benefit from methods and systems capable of quickly recognizing and reacting to new spam waves.

SUMMARY

According to one aspect, a method comprises: employing a computer system to receive a target string forming a part of an electronic communication; determining a string eligibility criterion according to the target string; and pre-filtering a corpus of reference strings according to the string eligibility criterion, to produce a plurality of candidate strings. In response to selecting the candidate strings, the computer system is employed to perform a first comparison between a character histogram of the target string and a character histogram of a candidate string of the plurality of candidate strings, and a second comparison between a timestamp of the electronic communication and a timestamp of the candidate string. The computer system determines whether the electronic communication is spam or non-spam according to a result of the first comparison and second comparison.

According to another aspect, a computer system comprises at least a processor programmed to: receive a target string forming a part of an electronic communication; determine a string eligibility criterion according to the target string; and pre-filter a corpus of reference strings according to the string eligibility criterion, to produce a plurality of candidate strings. The processor is further programmed to perform, in response to selecting the candidate strings, a first comparison between a character histogram of the target string and a character histogram of a candidate string of the plurality of candidate strings, and a second comparison between a timestamp of the electronic communication and a timestamp of the candidate string. The processor is further programmed to determine whether the electronic communication is spam or non-spam according to a result of the first comparison and second comparison.

According to another aspect, a method comprises: employing a computer system to receive an electronic communication; in response to receiving the electronic communication, extracting a target string from the electronic communication; transmitting the target string to an anti-spam server; and in response to transmitting the target string, receiving a target label indicative of whether the electronic communication is spam or non-spam, wherein the target label is determined at the anti-spam server. Determining the target label comprises: employing the anti-spam server to determine an eligibility criterion according to the target string; pre-filtering a corpus of reference strings according to the criterion condition, to produce a plurality of candidate strings; in response to selecting the candidate strings, performing a first comparison between a character histogram of the target string and a character histogram of a candidate string of the plurality of candidate strings, and a second comparison between a timestamp of the electronic communication and a timestamp of the candidate string; and determining the target label according to a result of the first comparison and second comparison.

According to another aspect, a method comprises: employing a computer system to receive a target string forming a part of an electronic communication; determining a string eligibility criterion according to the target string; pre-filtering a corpus of reference strings according to the string eligibility criterion, to produce a plurality of candidate strings. In response to selecting the candidate strings, the method employs the computer system to determine an inter-string distance separating the target string from a candidate string of the plurality of candidate strings, the inter-string distance determined according to a count of occurrences of a selected character within the target string and a count of occurrences of the selected character within the candidate string. The method then comprises determining whether the electronic communication is spam or non-spam according to the inter-string distance.

BRIEF DESCRIPTION OF THE DRAWINGS

The foregoing aspects and advantages of the present invention will become better understood upon reading the following detailed description and upon reference to the drawings where:

FIG. 3-A illustrates an exemplary spam detection transaction between a client computer and an anti-spam server, according to some embodiments of the present invention.

FIG. 3-B illustrates an exemplary spam detection transaction between a content server and an anti-spam server, according to some embodiments of the present invention.

FIG. 10-A shows a result of a computer experiment, comprising determining computation time to generate character histograms for a collection of test strings, as a function of the number of distinct characters of the test strings.

FIG. 10-B shows a result of a computer experiment, comprising determining computation time to generate character histograms for a collection of test strings, as a function of the string length of the test strings.

FIG. 10-C shows a result of a computer experiment, comprising determining computation time to calculate a set of inter-string distances for a collection of test strings, as a function of the number of distinct characters of the test strings.

FIG. 10-D shows a result of a computer experiment, comprising determining computation time to calculate a set of inter-string distances for a collection of test strings, as a function of the string length of the test strings.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Unless otherwise specified, the term spam is not limited to email spam, but also encompasses electronic communications such as non-legitimate or unsolicited commercial user-generated content in the form of blog comments, forum discussions, wiki entries, customer feedback, posts on social network sites, instant messages, as well as phone text and multimedia messages, among others. Computer readable media encompass non-transitory storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems comprising hardware programmed to perform the methods described herein, as well as computer-readable media encoding instructions to perform the methods described herein.

The following description illustrates embodiments of the invention by way of example and not necessarily by way of limitation.

Figure 1:
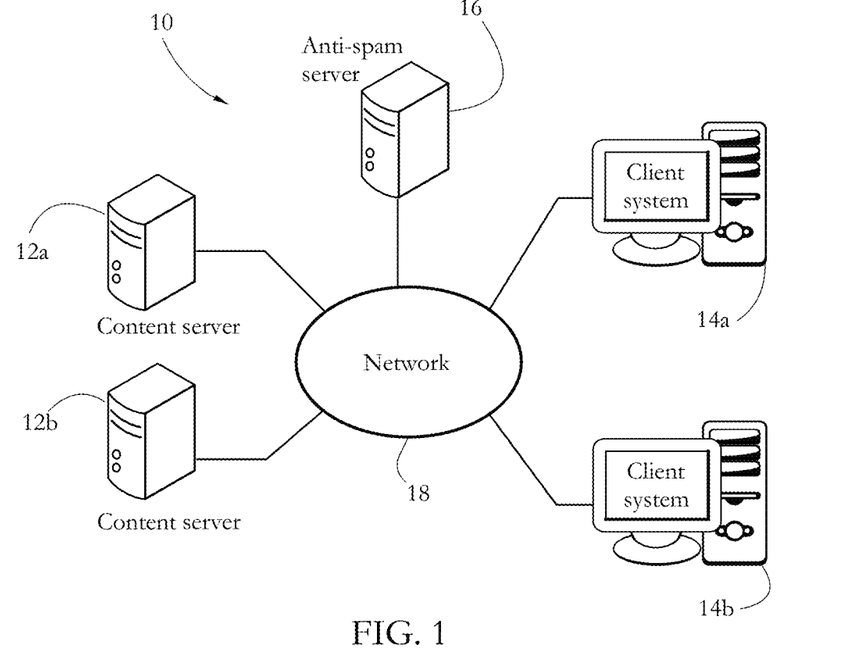
FIG. 1 shows an exemplary anti-spam system according to some embodiments of the present invention.

FIG. 1 shows an exemplary anti-spam system according to some embodiments of the present invention. System 10 includes a plurality of content servers 12a-b, an anti-spam server 16, and a plurality of client systems 14a-b. Content servers 12a-b may represent webservers hosting and/or delivering online content such as personal and corporate websites, blogs, social network sites, and online entertainment sites, among others. Other content servers 12a-b may represent email servers providing electronic message delivery to client systems 14a-b. Client systems 14a-b may represent end-user computers, each having a processor, memory, and storage, and running an operating system such as Windows®, MacOS® or Linux. Some client computer systems 14a-b may represent mobile computing and/or telecommunication devices such as tablet PCs, mobile telephones, and personal digital assistants (PDA). In some embodiments, client systems 14a-b may represent individual customers, or several client systems may belong to the same customer. Anti-spam server 16 may include one or more computer systems. A network 18 connects content servers 12a-b, client systems 14a-b, and anti-spam server 16. Network 18 may be a wide-area network such as the Internet, while parts of network 18 may also include a local area network (LAN).

Figure 2:
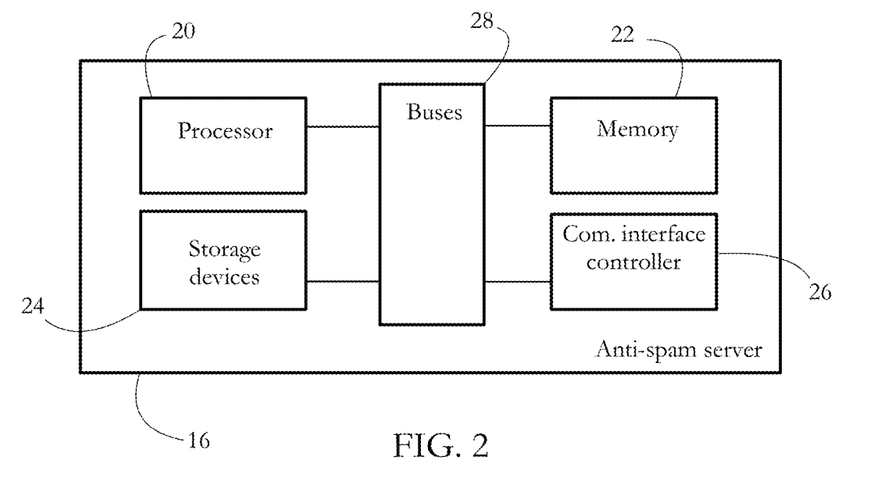
FIG. 2 shows an exemplary hardware configuration of a server computer system according to some embodiments of the present invention.

FIG. 2 shows an exemplary hardware configuration of a server computer system such as anti-spam server 16. In some embodiments, server 16 comprises a processor 20, a memory unit 22, a set of storage devices 24, and a communication interface controller 26, all connected by a set of buses 28.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise computer-readable media (e.g. RAM) storing data/signals accessed or generated by processor 20 in the course of carrying out instructions. Storage devices 24 include computer-readable media enabling the non-volatile storage, reading, and writing of software instructions and/or data. Exemplary storage devices 24 include magnetic and optical disks and semiconductor (e.g. flash) memory devices, as well as removable media such as CD and/or DVD disks and drives. Communication interface controller 26 enables server system 16 to connect to network 18 and/or to other machines/computer systems. Typical communication interface controllers 26 include network adapters. Buses 28 collectively represent the plurality of system, peripheral, and chipset buses, and/or all other circuitry enabling the inter-communication of devices 20-26 of server system 16. For example, buses 28 may comprise the northbridge bus connecting processor 20 to memory 22, and/or the southbridge bus connecting processor 20 to devices 24-26, among others.

In some embodiments, each client system 14*a-b* comprises a document reader application (e.g. web browser, email reader, media player), which may be a computer program used to remotely access data stored on content servers 12*a-b*. When a user accesses an online document such as a webpage, or receives an electronic communication such as email, data associated to the document/communication circulates on parts of network 18 between the respective content server and client system 14. In some embodiments, the reader application receives the document data, translates it into visual form and displays it to the user. Some embodiments of reader application may also allow the user to interact with the displayed content. In the case of email, client system 14*a-b* may include specialized software configured to classify incoming email into one of a plurality of categories (e.g., spam, legitimate, various other classes and subclasses).

In some embodiments, content servers 12*a-b* are configured to receive user-generated content (e.g. articles, blog entries, media uploads, comments etc.) from a plurality of users, and to organize, format, and deliver such content to third parties over network 18. A portion of user-generated data received at servers 12*a-b* may comprise electronic communications which may include unsolicited messages (spam). Examples of such electronic communications, referred to as target communications or target messages in the following description, are email messages, blog comments, posts to social networking sites, and comments sent to entertainment and/or news websites, among others.

In some embodiments, content servers 12*a-b* may comprise software components configured to process target communications received from users to detect spam. When detected, spam messages (e.g., fraudulent blog comments, etc.), may be blocked and/or prevented from being displayed within the respective website. Spam-processing software may be implemented on content servers 12*a-b* in the form of server-side scripts. Such scripts may be incorporated as plugins into larger script packages, e.g. as anti-spam plugin(s) for the Wordpress® or Drupal® online publishing platforms. In some embodiments, to detect spam, servers 12*a-b* may be configured to engage in a collaborative spam-detection transaction with anti-spam server 16, as described in detail below.

Figure 3:
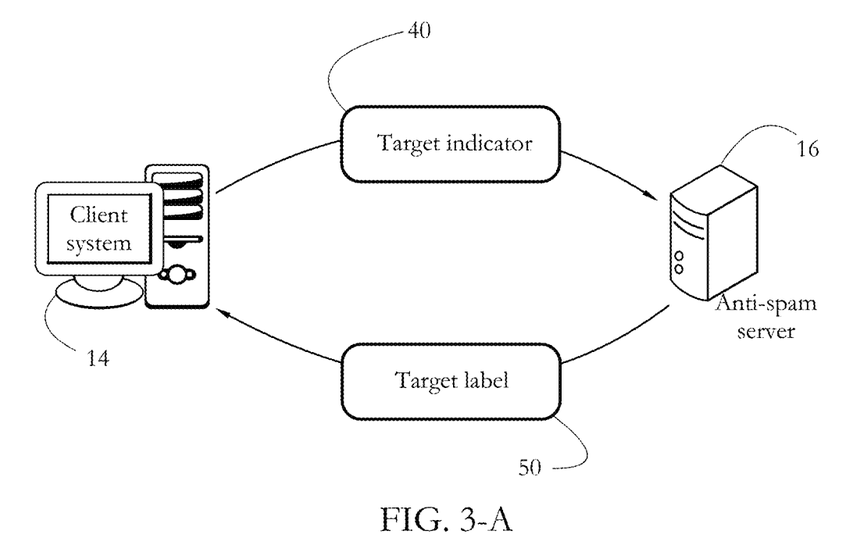

In some embodiments, anti-spam server 16 is configured to perform a collaborative spam-detection transaction with content servers 12*a-b* and/or client systems 14*a-b*. FIG. 3-A illustrates an exemplary data exchange between server 16 and a client system 14, in an embodiment configured to detect email spam. Client system 14 may receive email messages from a mail server over network 18. After receiving an email message, client system 14 may send a target indicator 40 comprising spam-identifying data associated to the email message to anti-spam server 16, and may receive in response a target label 50 indicative of whether the respective email message is spam. Client system 14 may subsequently place the message in an appropriate message category (e.g. spam or legitimate email).

FIG. 3-B illustrates an exemplary data exchange between anti-spam server 16 and a content server 12, in an embodiment configured to detect user-generated spam received at server 12, such as blog spam or spam posted on social network sites, among others. After receiving a target communication, e.g., as a result of a user posting a comment on a website hosted on server 12, server 12 may send target indicator 40 comprising spam-identifying data extracted from the target communication to anti-spam server 16, and in response receive target label 50 indicating whether the target communication is spam.

Figure 4:
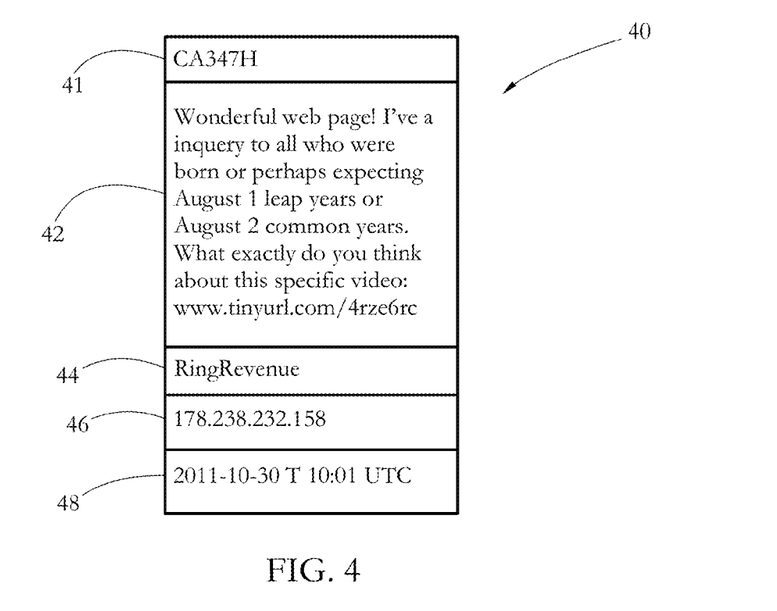
FIG. 4 shows an exemplary target indicator of a target communication, the indicator comprising a target string and additional spam-identifying data, according to some embodiments of the present invention.

FIG. 4 shows an exemplary target indicator of a target communication, according to some embodiments of the present invention. Target indicator 40 comprises an object ID 41 (e.g., label, hash) uniquely identifying the target communication, and a target string 42 including a text part of the target communication, such as a text part of a blog comment. In some embodiments, target string 42 comprises substantially all the text of the target communication. When the target communication includes several text parts, target string 42 may comprise a concatenation of text parts; alternatively, each text part may receive a distinct target string 42. In some embodiments, target string 42 comprises a section of the text part of the target communication, the section having a pre-set string length (e.g., 128 consecutive characters).

Some embodiments of target indicator 40 may include other spam-identifying data corresponding to the target communication beside target string 42. In the example of FIG. 4, target indicator 40 includes a username indicator 44 indicative of a name (e.g., personal name, pseudonym, screen name, login name, avatar, handle, etc.) provided by the submitter of the target communication, an address indicator 46 indicative of a location of origin (e.g. originating IP address) of the target communication, and a time stamp 48 indicative of a point in real time (e.g. date and time) when the target communication was submitted.

In some embodiments, target label 50 may comprise an object ID such as ID 41, and an indicator of the spam status of the target communication. Target label 50 effectively specifies whether the target communication is spam, according to the assessment performed by anti-spam server 16, as described in detail below.

Figure 5:
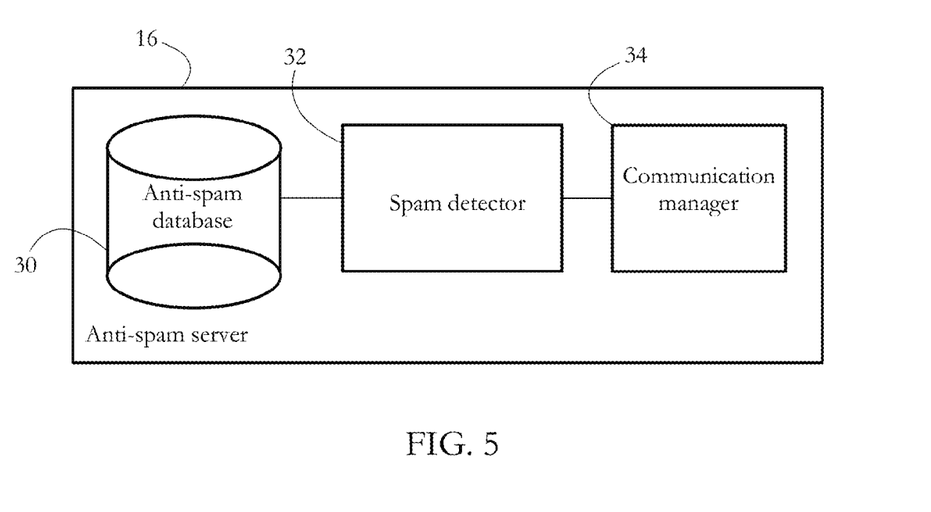
FIG. 5 shows a diagram of an exemplary set of applications executing on an anti-spam server according to some embodiments of the present invention.

FIG. 5 shows a diagram of an exemplary set of applications executing on anti-spam server 16 according to some embodiments of the present invention. applications include a spam detector 32 and a communication manager 34 connected o spam detector 32. applications 32 and 34 may be standalone computer programs, or may form part of larger software suites providing, for example, computer security services such as malware detection. In some embodiments, anti-spam server 16 also hosts an anti-spam database 30. Alternatively, anti-spam database may reside on a computer system distinct from server 16, but connected to server 16 via network 18, or on computer-readable media connected to server 16.

Anti-spam database 30 comprises a repository of knowledge related to online spam. In some embodiments, database 30 comprises a corpus of character histograms, each histogram calculated for an electronic communication as described further below. Database 30 may include data for both spam or non-spam electronic communications such as blog comments, comments posted on social network sites, etc. Beside histogram data, each record stored in database 30 may include additional information, such as string 42 of the respective target communication, a time indicator such as time stamp 48, and indicators of string length, number of distinct characters and string score of string 42; exemplary uses of such quantities are described below. In some embodiments, in relation to each character histogram, database 30 may store a cluster assignment indicator indicative of a cluster of messages the respective string is currently assigned to. Database 30 may also store a data structure comprising a plurality of identifiers such as object ID 41, each object identifier uniquely associated to an electronic communication, and a mapping associating each character histogram with the target communication it was calculated for, allowing spam detector 32 to selectively retrieve histograms from database 30, as shown below.

Figure 6:
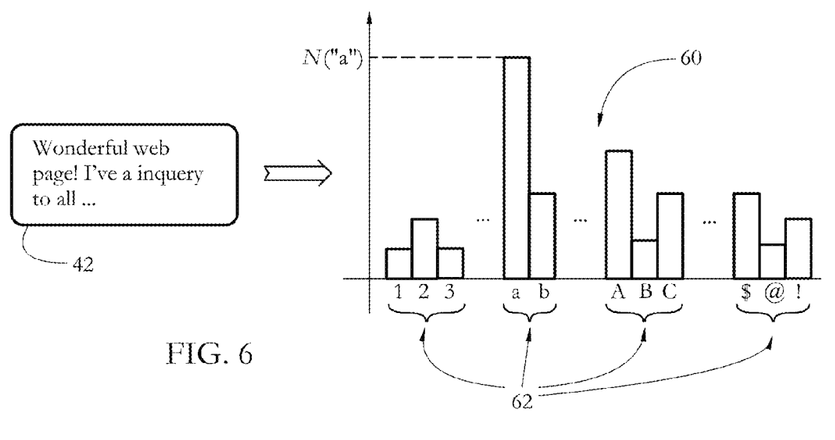
FIG. 6 shows an exemplary character histogram associated to a target string and computed for a plurality of character classes, according to some embodiments of the present invention.

FIG. 6 shows an exemplary character histogram computed for target string 42 according to some embodiments of the present invention. Target histogram 60 comprises a set of numbers, each number indicating a count of occurrences of each distinct character within target string 42. For example, a target histogram of "Mississippi" includes 1 for "M", 4 for "i", 4 for "s", and 2 for "p". In some embodiments, characters are grouped into several distinct character classes 62, such as "lowercase", "uppercase", "digits", and "special characters", among others. The number and composition of various character classes may vary among embodiments.

In some embodiments, communication manager 34 is configured to manage communication with client systems 14a-b and/or content servers 12a-b. For example, manager 34 may establish connections over network 18, send and receive data such as target indicators and target labels to/from client systems 14a-b, and content servers 12a-b.

Figure 7:
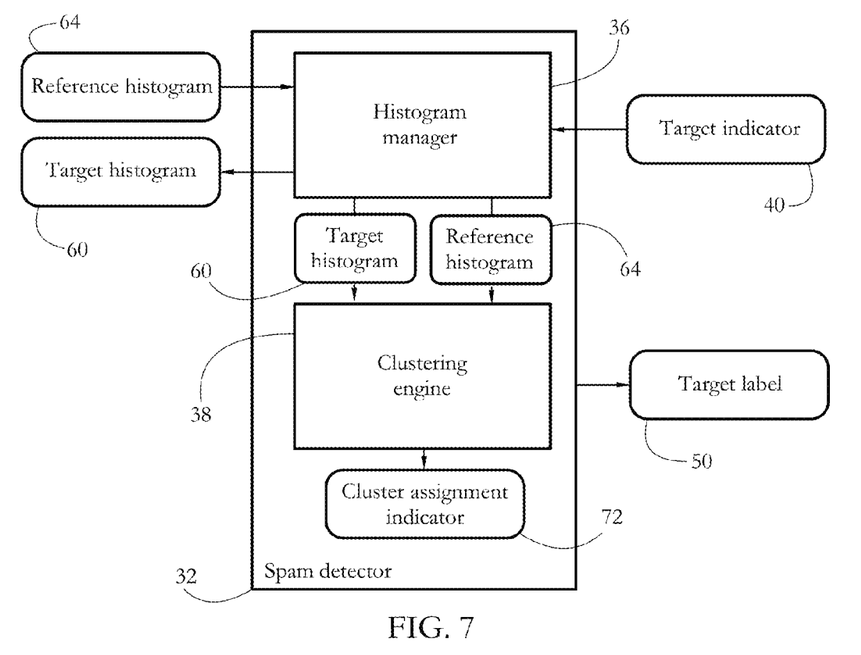
FIG. 7 illustrates an exemplary spam detector application operating on the anti-spam server of FIG. 1, according to some embodiments of the present invention.

FIG. 7 shows a diagram of an exemplary spam detector operating on anti-spam server 16 according to some embodiments of the present invention. Spam detector 32 comprises a histogram manager 36 and a clustering engine 38 connected to histogram manager 36. Spam detector 32 may receive target indicator 40 of a target communication from communication manager 34 (see FIGS. 5 and 3-A-B) and a reference histogram 64 from anti-spam database 30, and in turn outputs target label 50 to communication manager 34, to be forwarded to client system 14 or content server 12 which initiated the respective spam-detection transaction.

In some embodiments, histogram manager 36 is configured to receive target indicator 40 from communication manager 34, to compute target histogram 60 from data of target indicator 40, to perform a pre-filtering process to determine a set of eligible reference histograms 64, to selectively retrieve reference histograms 64 from anti-spam database 30, and to forward histograms 60 and 64 to clustering engine 38 for histogram comparison and cluster assignment. The operation of histogram manager 36 will be discussed in detail in relation to FIG. 9.

Figure 8:
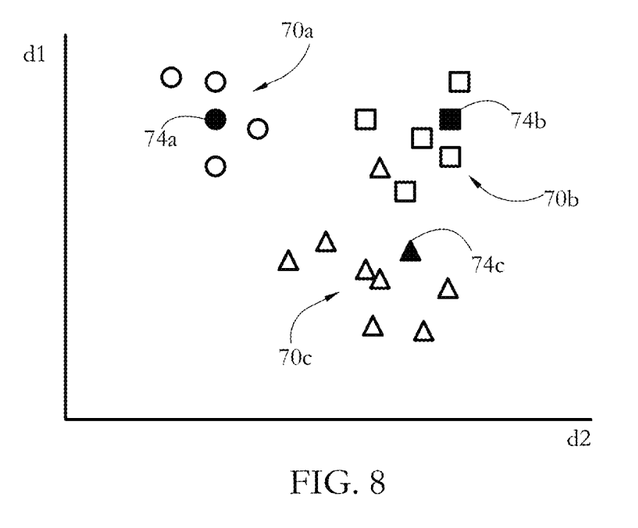
FIG. 8 illustrates a plurality of clusters, each cluster comprising a collection of similar items, represented in a feature hyperspace according to some embodiments of the present invention.

In some embodiments, target message analysis is performed in a message feature hyperspace, by analyzing distances between a feature vector corresponding to a target communication and a set of representative vectors, each defining a distinct collection (cluster) of messages. FIG. 8 shows three exemplary message clusters 70a-c formed by feature vectors 74a-c, respectively, in a simple 2-D feature space having two axes, d1 and d2. In some embodiments of the present invention, axes d1 and d2 correspond to distinct features of the character histogram. For example, axis d1 may correspond to character "M" and axis d2 to character "s". Then string "Mississippi" may be represented by feature vector (1,4), considering that "M" appears once, while "s" appears four times within the respective string. Two strings having similar character histograms reside close to each other in this exemplary feature hyperspace: in the above example, "Mississippi" and "Mission:impossible" have identical feature vectors in this space. In some embodiments, each message cluster 70 consists of messages which occupy a substantially small region of feature hyperspace, meaning that all members of a cluster have similar feature vectors, i.e., similar character histograms.

In some embodiments, clustering engine 38 is configured to maintain a collection of message clusters 70, representing a corpus of communications received at anti-spam server 16 during a history of data accumulation, grouped into clusters according to similarity. Some clusters 70 may represent individual spam waves, each including copies or variants of the same spam message sent to a multitude of clients and/or posted on a multitude of websites. Ideally, a message cluster consists of identical or nearly-identical target strings. Clustering engine 38 is further configured to receive target histogram 60 and to assign the target communication represented by histogram 60 to a cluster of messages that it is most similar to according to histogram similarity. To perform cluster assignment, clustering engine 38 receives a set of reference histograms 64 from histogram manager 36, each histogram 64 representative of a cluster, and compares histograms 60 and 64 to determine which message cluster best matches target histogram 60. More details of the operation of clustering engine 38 are given below, in relation to FIG. 9.

Figure 9:
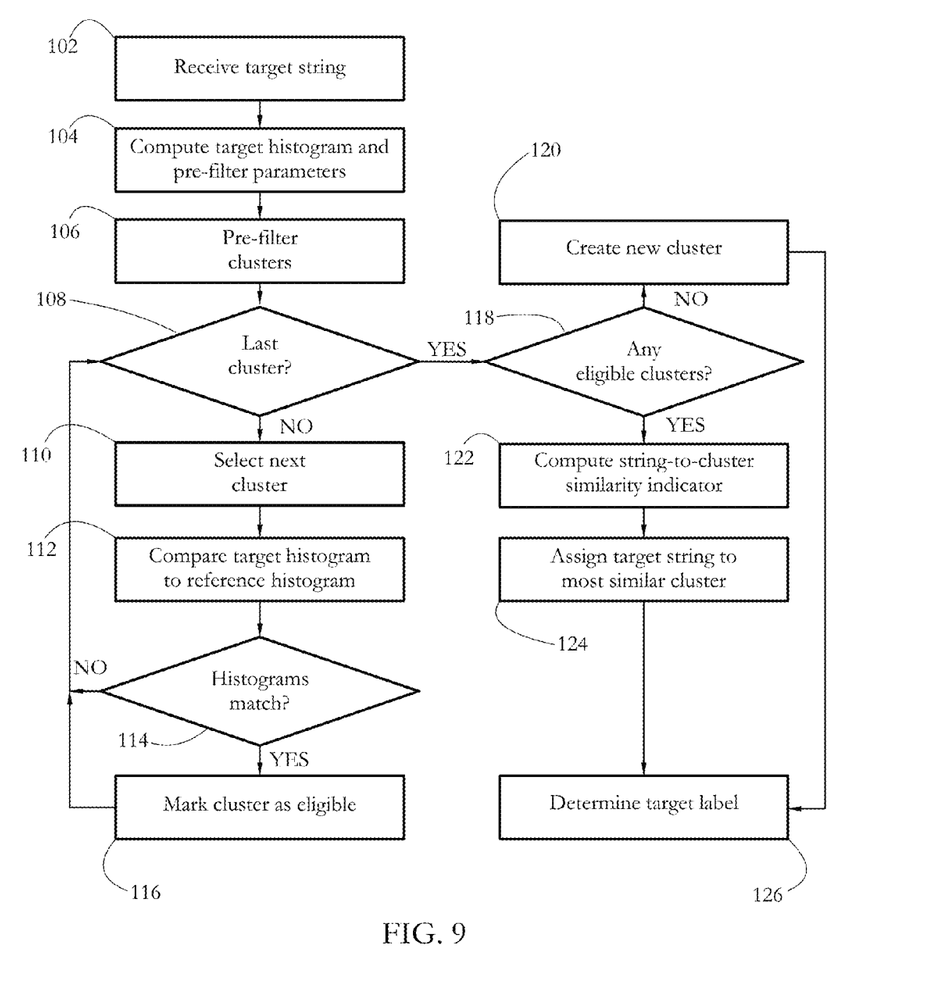
FIG. 9 shows an exemplary sequence of steps performed by the spam detector of FIG. 7 according to some embodiments of the present invention.

FIG. 9 shows an exemplary sequence of steps performed by spam detector 32 (FIG. 7) within a spam-detection transaction, according to some embodiments of the present invention. In a step 102, spam detector 32 receives target indicator 40 from client system 14 or content server 12, via communication manager 34. Next, in a step 104, spam detector extracts target string 42 according to target indicator 40, and computes character histogram 60 of string 42. Step 104 may also comprise the computation of several parameters of target string 42, such as string length and/or number of distinct characters, which are used to pre-filter the collection of message clusters in a step 106. In some embodiments, in step 106, spam detector 32 performs a pre-filtering operation to select, according to a set of pre-filtering conditions, a subset of candidate message clusters from the complete collection maintained by clustering engine 38. By selecting only a (small) subset of clusters with which to perform histogram comparisons, spam detector 32 may effectively reduce computational costs.

In some embodiments, spam detector 32 may select the subset of candidate clusters according to string length. The string length of target string 42 is compared to the string length of a representative of each cluster, or to an average string length of members of the respective cluster. A cluster may be selected as a candidate for histogram comparison when its typical string length is within a predetermined threshold of the string length of target string 42.

An alternative pre-filtering criterion is the number (count) of distinct characters. For example: the string "Mississippi" has 4 distinct characters: M, i, s, and p. For each cluster, the number of distinct characters of target string 42 is compared to the number of distinct characters of a representative member of the respective cluster, or to an average number of distinct characters of the members of a cluster; clusters having similar numbers of distinct characters as target string 42 are selected as candidates for histogram comparison.

In some embodiments, pre-filtering may proceed according to a string score computed as follows:

$$S = \sum_i p_i w_i, \qquad [1]$$

wherein i indexes the characters of the string, $p_i$ denotes a position indicator of character i within the set of all characters (e.g., an ASCII code of the respective character), and $w_i$ denotes a character-specific weight of the respective character. In some embodiments, characters are divided into several classes, such as classes 62 illustrated in FIG. 6: lowercase, uppercase, digits, and special characters, among others.

Weights w(i) may be identical within the same class of characters, but may differ from one class to another. For example, the weight associated to a special character may be higher than the weight of a lowercase letter. For each cluster, the string score [1] of target string 42 is compared to the string score of a representative member of the respective cluster or to an average string score of the cluster; clusters having similar string scores as target string 42 are selected as candidates for histogram comparison.

In some embodiments, pre-filtering criteria may be combined. For example, a first subset of message clusters may be selected according to string score similarity; then, out of the first subset of clusters, a second subset is selected, wherein each cluster has a similar string length and a similar number of distinct character to target string 42.

Having selected a set of candidates for histogram comparison, for each selected cluster, spam detector 32 may instruct histogram manager 36 to selectively retrieve from anti-spam database 30 a reference histogram 64 corresponding to a representative message of the respective cluster. Then, a loop sequence of steps 108-116 is executed for each selected cluster. In a step 108, spam detector may verify whether all selected clusters were evaluated by histogram comparison. If yes, spam detector 32 proceeds to a step 118 described below. If no, in a step 110, the next cluster is evaluated. In a step 112, target histogram 60 is compared to reference histogram 64.

In some embodiments, step 112 comprises computing a set of inter-string distances indicative of the degree of similarity between histograms 60 and 64. In some embodiments, an inter-string distance between two strings $s_1$ and $s_2$ may be formulated as:

$$D_1(s_1, s_2) = \sum_{i \in s_1 \cap s_2} w_i |N_1^i - N_2^i|, \quad [2]$$

wherein i indexes the subset of characters common to string $s_1$ and $s_2$, $w_i$ is the character weight of character i, $N_1^i$ denotes the count of occurrences of character i within string $s_1$, and wherein $N_2^i$ denotes the count of occurrences of character i within string $s_2$. An alternative inter-string distance is given by:

$$D_2(s_1, s_2) = \sum_{i \in s_1 - s_2} w_i \cdot c, \quad [3]$$

wherein i indexes the subset of characters present only in $s_1$, but not in $s_2$, $w_i$ is the weight of character i, and c is a predetermined, character-independent constant. As discussed above, weights $w_i$ may be character-specific or class-specific (e.g., special characters vs. lowercase letters). A rationale for using character-specific weights is that some characters are used more often than others for text obfuscation, a method frequently employed by spammers and consisting of replacing certain characters in a text with other characters (e.g. "vi4gra"), to avoid spam detection. By assigning relatively small weights to characters which are used in obfuscation, obfuscated versions of a target string may appear very similar to each other according to the inter-string distance, and may all therefore be correctly identified as spam. The value of c may be used as a tuning parameter: if c is too small, two rather different strings may be mistakenly considered to be similar; if c is too large, small differences between strings may be excessively amplified.

Some embodiments may compute a combined inter-string distance:

$$D_3(s_1, s_2) = D_1(s_1, s_2) + D_2(s_1, s_2). \quad [4]$$

Also, since $D_2$ is not commutative, an alternative inter-string distance is:

$$D_4(s_1, s_2) = D_2(s_1, s_2) + D_2(s_2, s_1). \quad [5]$$

In some embodiments, step 112 (FIG. 9) comprises computing $D_1(T,R)$ and/or $D_2(T,R)$, wherein T denotes target string 42 and R denotes the reference string associated to reference histogram 64. Alternatively, spam detector may compute $D_3(T,R)$, $D_3(R,T)$, and/or $D_4(T,R)$. Next, a step 114 determines whether a match is found between target histogram 60 and reference histogram 64.

In some embodiments, a histogram match requires that an inter-string distance be smaller than a predetermined threshold. For example, a histogram match may require that either $D_1 < t_1$ or $D_1 < t_2$, or that both $D_1$ and $D_2$ be lower than their respective thresholds. Alternatively, a histogram match requires that $D_3 = D_1 + D_2 < t_3$. In yet another embodiment, both $D_3(T,R)$ and $D_3(R,T)$ must be lower than a threshold, or $D_4 < t_4$ for a successful match. Threshold values $t_i$ may be independent of the strings being compared, or may vary according to the string length and/or to the number of distinct characters of target string 42. In some embodiments, higher threshold values are used for comparatively longer strings, or strings with comparatively larger number of distinct characters.

When a match between histograms 60 and 64 is found, spam detector 32 proceeds to a step 116, in which the respective message cluster is marked as eligible to receive target string 42. If histograms do not match, spam detector 32 returns to step 108. When all message clusters selected in step 106 have been evaluated by histogram comparison, a step 118 determines whether any clusters are eligible for receiving target string 42. If yes, in a step 122 spam detector 32 may compute, for each eligible cluster, a string-to-cluster similarity indicator indicative of how similar target string 42 is to all members of the respective cluster. An exemplary string-to-cluster similarity indicator of each eligible cluster comprises the fraction of cluster members having reference histograms matching target histogram 60.

Next, a step 124 carries out the actual assignment of target string 42 to the message cluster to which it is most similar. In some embodiments, target string 42 is assigned to the cluster with the highest string-to-cluster similarity indicator, determined in step 122. Clustering engine 38 may update cluster assignment data to reflect the addition of a new cluster member, and a record of target string 42 may be introduced in anti-spam database 30. In some embodiments, step 124 further includes the determination of a set of spam-identifying parameters associated to the cluster receiving the target message. For example, some embodiments may compute a time interval elapsed between successive timestamps, within the same cluster. Such parameters may be saved in relation to each cluster, and may be used to determine automatically (without the supervision of a human operator) whether a particular cluster includes spam or legitimate messages, or whether a particular cluster is likely to represent a spam wave.

When no clusters were found eligible to receive the target message (step 118), indicating that target string 42 is likely to be distinct from any already stored in anti-spam database, in a step 120 clustering engine 38 may create a new cluster with the target message as the sole member, and may save a record of the target message into anti-spam database 30.

In a step 126, spam detector 32 may determine target label 50 identifying the target communication as spam or legitimate. In some embodiments, the decision whether the target communication is spam is made according to the cluster assignment of target string 42. When string 42 is assigned to a cluster consisting mainly of spam messages, then the target message may receive a spam label as well.

In some embodiments, label 50 is determined according to certain spam-identifying features of the members of the cluster that the target message was assigned to. One such spam-identifying feature is timestamp 48. The assignment of numerous new members in a short time interval may be an indication that the respective cluster consists of a wave of spam messages. In some embodiments, spam detector 32 may determine a time interval elapsed between a plurality of timestamps associated to members of a cluster, e.g. the shortest time interval within which 6 members where assigned to that cluster, and when the time interval drops below a predetermined threshold, mark the respective cluster as spam. In some embodiments, the count of cluster members may be used as a spam-identifying feature: when a cluster acquires in excess of a predetermined number of members, the respective cluster may be marked as spam.

The exemplary systems and methods described above allow an anti-spam system to detect unsolicited communication in the form of user-generated content on the Internet in the form of blog comments, comments posted on social network sites, etc., and also content in the form of email messages, instant messages, and phone text and multimedia messages.

In some embodiments, a computer system extracts a target string of characters from an electronic communication such as a blog comment, transmits it to an anti-spam server, and receives an indicator of whether the respective electronic communication is spam or non-spam from the anti-spam server. When the electronic communication is spam, the computer system may block, quarantine, erase, or in any other way restrict the display of the electronic communication and/or may issue a warning to the user.

The anti-spam server determines whether the electronic communication is spam or non-spam according to a frequency of occurrence of certain characters within the target string. A character histogram of the target string is computed and compared against histograms computed for a corpus of electronic communications, possibly including both spam and non-spam messages. The methods and systems described in the present invention exploit the observation that two similar strings always have similar character histograms. Therefore, finding a match between the histogram of the target string and another histogram computed for a reference string may be an indication that the target string is similar to the reference string. In such a case, the anti-spam server may determine whether the electronic communication is spam according to whether the reference string is indicative of spam, e.g., whether the reference string belongs to a cluster of electronic communications labeled as spam.

However, there are many situations in which two distinct strings have very similar histograms. To avoid a false positive identification, other features of the target string, such as a timestamp, may be considered when making a decision whether two strings are similar.

Histogram comparison may not be a reliable method of identifying similar strings when string length exceeds a certain threshold. In the limit of very long strings all strings have very similar histograms, which simply indicate a natural frequency of occurrence of each character in the respective language. Therefore, the systems and methods described here are particularly suited to analyze short strings, appearing in electronic communications such as blog posts and comments on social networking sites such as Facebook® and Twitter®.

An additional problem for spam detection by string comparison is obfuscation, in which spammers may replace certain characters in a message with other characters (e.g., Vi4gra), to avoid detection. String obfuscation may be addressed by employing a weight specific to each character, and determining an inter-string distance according to each character count and weight, such as in formulae [2-3]. Character-specific weights allow for tuning the sensitivity of string comparison. In some embodiments, characters may be grouped by categories (e.g., letters, digits, special characters), all characters of a category receiving an identical, category-specific weight. Such grouping may address text obfuscation since, for example, obfuscation with random letters is more prevalent than text obfuscation with other types of characters. When certain characters are used in obfuscation more than others, assigning them a comparatively smaller weight advantageously reduces the inter-string distance between two obfuscated versions of the same string, making the two strings appear more similar.

Some embodiments of the present invention organize the corpus into a plurality of clusters, each cluster of records consisting of similar strings. Instead of performing histogram comparisons over all records of the corpus, clustering allows comparing the target string to only one representative target string per cluster, thus significantly reducing computational costs.

Clustering may also facilitate automatic (unsupervised) spam detection. As opposed to conventional clustering methods, wherein message classification is commonly achieved by a supervised training of a classifier, e.g., on a training corpus previously sorted into a plurality of pre-determined message classes, some embodiments of the present invention perform a dynamic clustering, without prior knowledge of the spam status (spam vs. non-spam) of clusters or messages. A cluster may be automatically identified as representing spam when it accumulates a certain number of members in a short time interval.

In a computer experiment, a corpus of 22,000 blog comments was classified into clusters according to some embodiments of the present invention. Calculations were carried out on a computer system equipped with a Pentium 4 processor at 3 GHz and 1.5 GB of RAM, running Ubuntu OS 10.04. Classification took approximately 5:00 minutes of computation time, producing 1,741 message clusters with more than one cluster member, averaging 4.13 messages per cluster. By comparison, a conventional clustering system employing a hash-based string matching algorithm and executing on the same hardware platform produced 1,617 clusters with more than one member in 7:07 minutes of computation time, with an average of 4.26 comments per cluster.

Figure 10:
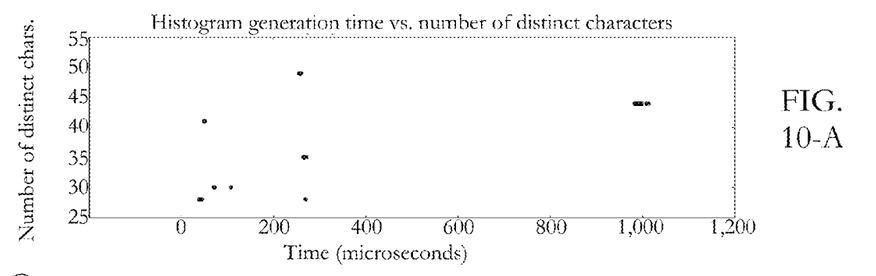

FIGS. 10-A-D show results of a computer experiment, performed with a collection of test strings ranging in string length from approximately 25 to 5500 characters. The hardware configuration was the same as above. FIG. 10-A shows the time taken to generate character histograms as a function of the number of distinct characters of the test strings. FIG. 10-B shows the time taken to generate character histograms as a function of the string length of the test strings. The computation time per histogram varied from a few microseconds to approximately one millisecond, with approximately linear correlation between time and string length.

FIG. 10-C shows the time taken to calculate a set of inter-string distances according to as a function of the number of distinct characters of the test strings, while FIG. 10-D shows the same data plotted as a function of the string length of the test strings. Computation of inter-string distances was performed from character count determinations, according to formulas [2-3], and ranged from a few microseconds to around 500 microseconds.

Figure 11:
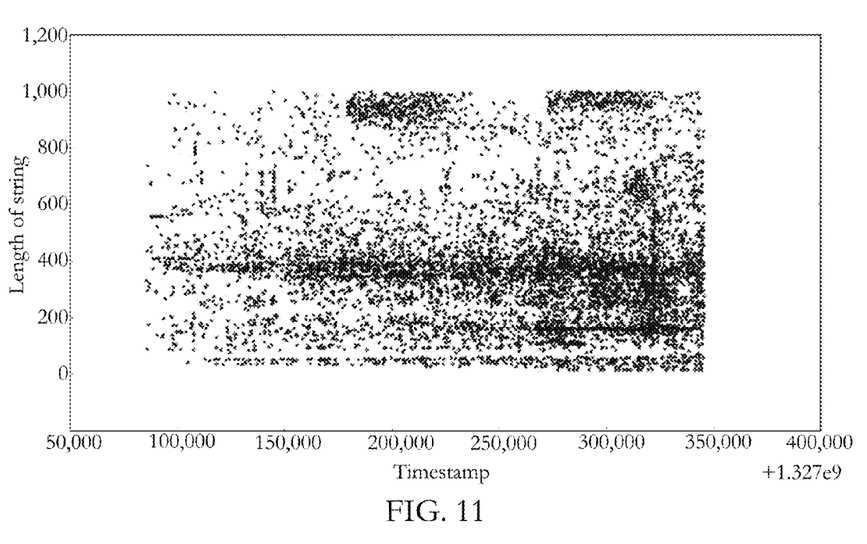
FIG. 11 shows a plot of string length versus a timestamp indicator, for a collection of real blog comments, comprising both spam and non-spam.
Figure 12:
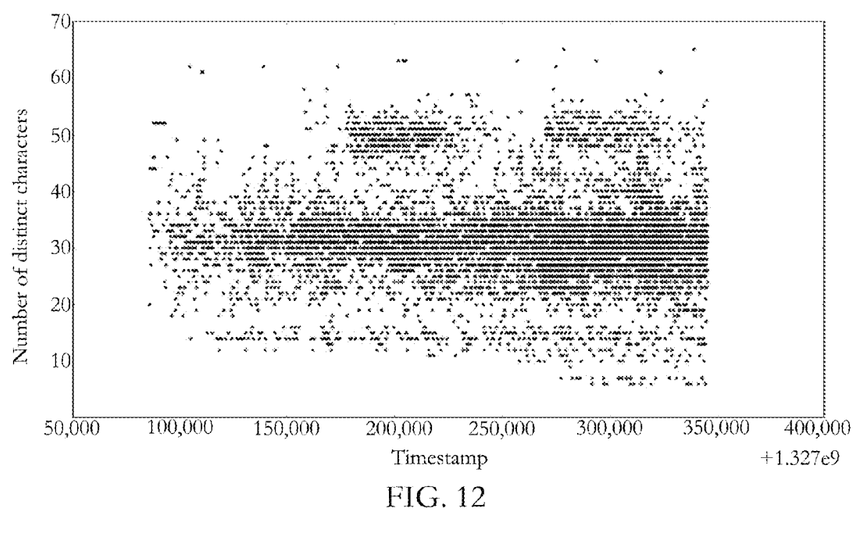
FIG. 12 shows a plot of a number of distinct characters versus a timestamp indicator, for a collection of real blog comments, comprising both spam and non-spam.

FIG. 11 shows string length plotted versus a timestamp indicator, for a collection of 8676 real blog comments, comprising both spam and non-spam. FIG. 12 shows the number of distinct characters, plotted versus a timestamp indicator, for another collection of 5351 real blog comments, comprising both spam and non-spam. Both FIGS. 11 and 12 indicate a clustering of spam messages according to timestamp and string length, allowing automatic spam identification as described above.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
in response to receiving a target string forming a part of an electronic communication, employing at least one processor of a computer system to
select a plurality of candidate strings from a corpus of reference strings, wherein selecting the plurality of candidate strings comprises:
comparing a string length of the target string to a string length of a reference string of the corpus, and
in response, selecting the reference string into the plurality of candidate strings according to a result of the comparison of string lengths;
in response to selecting the plurality of candidate strings, employing the at least one processor to perform a first comparison between the target string and a candidate string of the plurality of candidate strings, and a second comparison between the target string and the candidate string; and
employing the at least one processor to determine whether the electronic communication is spam or non-spam according to a result of the first comparison and the second comparison,
wherein the first comparison comprises comparing, for each character of a plurality of distinct alphanumeric characters, a count of occurrences of the each character within the target string to a count of occurrences of the each character within the reference string, wherein the count of occurrences of the each character within the target string is determined without regard to a position of the each character relative to other characters within the target string, and
wherein the second comparison comprises comparing a timestamp of the electronic communication to a timestamp of another electronic communication, the another electronic communication containing the candidate string.

2. The method of claim 1, wherein the corpus of reference strings comprises a plurality of clusters, each cluster including a set of mutually-similar strings, wherein each candidate string of the plurality of candidate strings is representative of a distinct cluster, and wherein the method further comprises, in response to performing the first comparison, employing the computer system to select a cluster from the plurality of clusters and to assign the target string to the selected cluster.

3. The method of claim 2, further comprising determining whether the target communication is spam or non-spam according to a plurality of timestamps, each timestamp of the plurality of timestamps corresponding to a member of the selected cluster.

4. The method of claim 2, further comprising:
in response to assigning the target string to the selected cluster, determining a count of cluster members of the selected cluster; and
determining whether the electronic communication is spam or non-spam according to the count of cluster members.

5. The method of claim 2, further comprising identifying the electronic communication as belonging to a selected spam wave according to the selected cluster.

6. The method of claim 1, wherein selecting the plurality of candidate strings further comprises:
determining a first count of distinct characters of the target string and a second count of distinct characters of the reference string, and
when the first count differs from the second count by an amount smaller than a predetermined threshold, selecting the reference string into the plurality of candidate strings.

7. The method of claim 1, wherein selecting the plurality of candidate strings further comprises:
determining a first string score of the target string as a function of:

$$\sum_i p_i w_i$$

wherein $p_i$ denotes an ASCII code of the i-th character of the target string, and $w_i$ is a character-specific weight;
determining a second string score of the reference string; and
when the first string score differs from the second string score by an amount smaller than a predetermined threshold, selecting the reference string into the plurality of candidate strings.

8. The method of claim 1, wherein performing the first comparison comprises determining an inter-string distance as a function of:

$$\sum_{i \in T \cap C} w_i |N_T^i - N_C^i|,$$

wherein T denotes the set of characters of the target string, C denotes the set of characters of the candidate string, $N^i_T$ denotes a count of occurrences of character i within the target string, $N^i_C$ denotes a count of occurrences of character i within the candidate string, and wherein $w_i$ is a character-specific weight of character i.

9. The method of claim 8, wherein the inter-string distance is further determined as a function of:

$$\sum_{j \in T-C} w_j \cdot c,$$

wherein character j occurs within the target string, but does not occur within the candidate string, $w_j$ is a character-specific weight of character j, and c is a number selected according to the string length of the target string.

10. The method of claim 1, wherein performing the first comparison comprises determining an inter-string distance as a function of:

$$\sum_{i \in T-C} w_i \cdot c,$$

wherein T denotes the set of characters of the target string, C denotes the set of characters of the candidate string, wherein character i occurs within the target string, but does not occur within the candidate string, $w_i$ is a character-specific weight of character i, and c is a number selected according to the string length of the target string.

11. The method of claim 1, wherein the electronic communication comprises a blog comment.

12. The method of claim 1, wherein the electronic communication comprises a message posted on a social network site.

13. A computer system comprising at least one processor programmed to:
in response to receiving a target string forming part of an electronic communication, select a plurality of candidate strings from a corpus of reference strings, wherein selecting the plurality of candidate strings comprises:
comparing a string length of the target string to a string length of a reference string of the corpus, and
in response, selecting the reference string into the plurality of candidate strings according to a result of the comparison of string lengths;
in response to selecting the candidate strings, perform a first comparison between the target string and a candidate string of the plurality of candidate strings, and a second comparison between the target string and the candidate string; and
determine whether the electronic communication is spam or non-spam according to a result of the first comparison and the second comparison,
wherein the first comparison comprises comparing, for each character of a plurality of distinct alphanumeric characters, a count of occurrences of the each character within the target string to a count of occurrences of the each character within the reference string, wherein the count of ocurrences of the each character within the target string is determined without regard to a position of the each character relative to other characters within the target string, and
wherein the second comparison comprises comparing a timestamp of the electronic communication to a timestamp of a another electronic communication containing the candidate string.

14. The computer system of claim 13, wherein the corpus of reference strings comprises a plurality of clusters, each cluster including a set of similar strings, wherein each candidate string of the plurality of candidate strings is representative of a distinct cluster, and wherein the processor is further programmed, in response to performing the first comparison, to select a cluster from the plurality of clusters and to assign the target string to the selected cluster.

15. The computer system of claim 14, wherein the at least one processor is further programmed to determine whether the target communication is spam or non-spam according to a plurality of timestamps, each timestamp of the plurality of timestamps corresponding to a member of the selected cluster.

16. The computer system of claim 14, wherein the at least one processor is further programmed to:
in response to assigning the target string to the selected cluster, determine a count of cluster members of the selected cluster; and
determine whether the electronic communication is spam or non-spam according to the count of cluster members.

17. The computer system of claim 14, wherein the at least one processor is further programmed to identify the electronic communication as belonging to a selected spam wave according to the selected cluster.

18. The computer system of claim 13, wherein selecting the plurality of candidate strings further comprises:
determining a first count of distinct characters of the target string and a second count of distinct characters of the reference string, and
when the first count differs from the second count by an amount smaller than a predetermined threshold, selecting the reference string into the plurality of candidate strings.

19. The computer system of claim 13, wherein selecting the plurality of candidate strings comprises:
determining a first string score of the target string as a function of:

$$\sum_i p_i w_i,$$

wherein $p_i$ denotes an ASCII code of the i-th character of the target string, and $w_i$ is a character-specific weight;
determining a second string score of the reference string; and
when the first string score differs from the second string score by an amount smaller than a predetermined threshold, selecting the reference string into the plurality of candidate strings.

20. The computer system of claim 13, wherein performing the first comparison comprises determining an inter-string distance as a function of:

$$\sum_{i \in T \cap C} w_i |N_T^i - N_C^i|,$$

wherein T denotes the set of characters of the target string, C denotes the set of characters of the candidate string, $N_T^i$ denotes a count of occurrences of character i within the target string, $N_C^i$ denotes a count of occurrences of character i within the candidate string, and wherein $w_i$ is a character-specific weight of character i.

21. The computer system of claim 20, wherein the inter-string distance is further determined as a function of:

$$\sum_{j \in T-C} w_j \cdot c,$$

wherein character j occurs within the target string, but does not occur within the candidate string, wj is a character-specific weight of character j, and c is a number selected according to the string length of the target string.

22. The computer system of claim 13, wherein performing the first comparison comprises determining an inter-string distance as a function of:

$$\sum_{i \in T-C} w_i \cdot c,$$

wherein T denotes the set of characters of the target string, C denotes the set of characters of the candidate string, wherein character i occurs within the target string, but does not occur within the candidate string, $w_i$ is a character-specific weight of character i, and c is a number selected according to the string length of the target string.

23. The computer system of claim 13, wherein the electronic communication comprises a blog comment.

24. The computer system of claim 13, wherein the electronic communication comprises a message posted on a social network site.

25. A method comprising:
employing at least one processor of a computer system to receive an electronic communication;
in response to receiving the electronic communication, employing the at least one processor to extract a target string from the electronic communication;
employing the at least one processor to transmit the target string to an anti-spam server; and
in response to transmitting the target string, employing the at least one processor to receive a target label indicative of whether the electronic communication is spam or non-spam, wherein the target label is determined at the anti-spam server and wherein determining the target label comprises:
employing the anti-spam server to select a plurality of candidate strings from a corpus of reference strings, wherein selecting the plurality of candidate strings comprises:
comparing a string length of the target string to a string length of a reference string of the corpus, and
in response, selecting the reference string into the plurality of candidate strings according to a result of the comparison of string lengths;
in response to selecting the candidate strings, employing the anti-spam server to perform a first comparison between the target string and a candidate string of the plurality of candidate strings, and a second comparison between the target string and the candidate string; and
employing the anti-spam server to determine the target label according to a result of the first comparison and the second comparison,
wherein the first comparison comprises comparing, for each character of a plurality of distinct alphanumeric characters, a count of occurrences of the each character within the target string to a count of occurrences of the each character within the reference string, wherein the count of occurrences of the each character within the target string is determined without regard to a position of the each character relative to other characters within the target string, and
wherein the second comparison comprises comparing a timestamp of the electronic communication to a timestamp of another electronic communication containing the candidate string.

26. A method comprising:
in response to receiving a target string forming part of an electronic communication, employing at least one processor of a computer system to select a plurality of candidate strings from a corpus of reference strings, wherein selecting the plurality of candidate strings comprises:
comparing a string length of the target string to a string length of a reference string of the corpus, and
in response, select the reference string into the plurality of candidate strings according to a result of the comparison of string lengths;
in response to selecting the candidate strings, employing the at least one processor to determine an inter-string distance separating the target string from a candidate string of the plurality of candidate strings, the inter-string distance determined according to a count of occurrences within the target string of each character of a plurality of distinct alphanumeric characters, and according to a count of occurrences of the each character within the candidate string, wherein the count of occurrences of the each character within the target string is determined without regard to a position of the each character relative to other characters within the target string; and
employing the at least one processor to determine whether the electronic communication is spam or non-spam according to the inter-string distance.

\* \* \* \* \*